O. M. LARAWAY & G. S. KING.
Horse Hay-Rake.
No. 207,811. Patented Sept. 10, 1878.
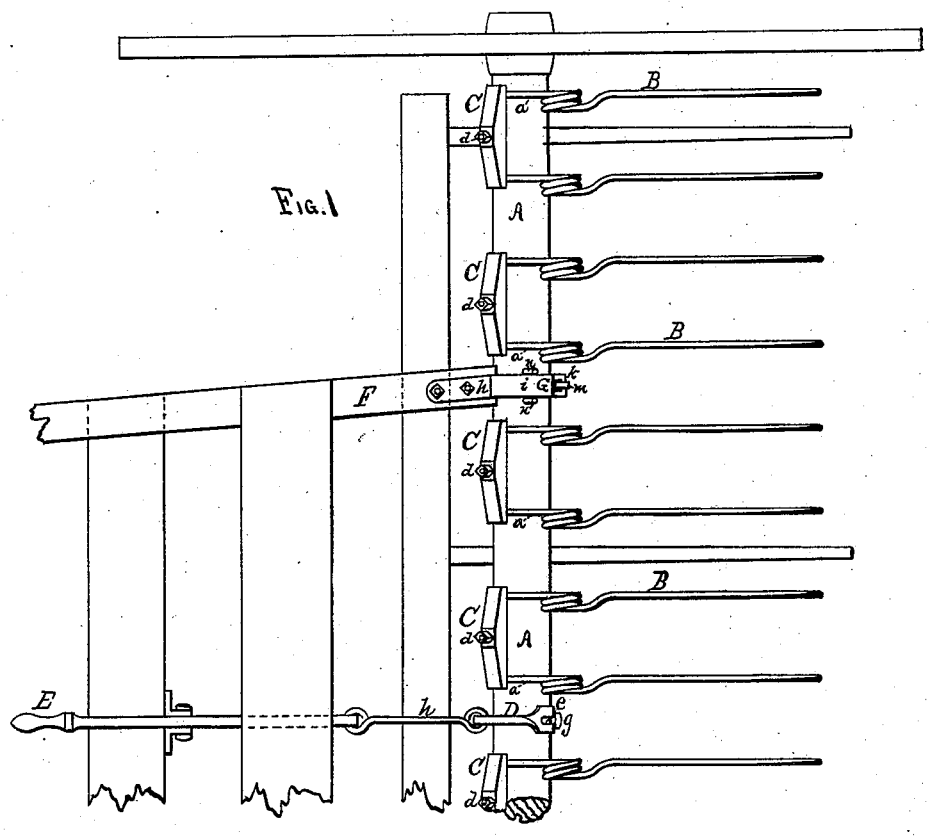
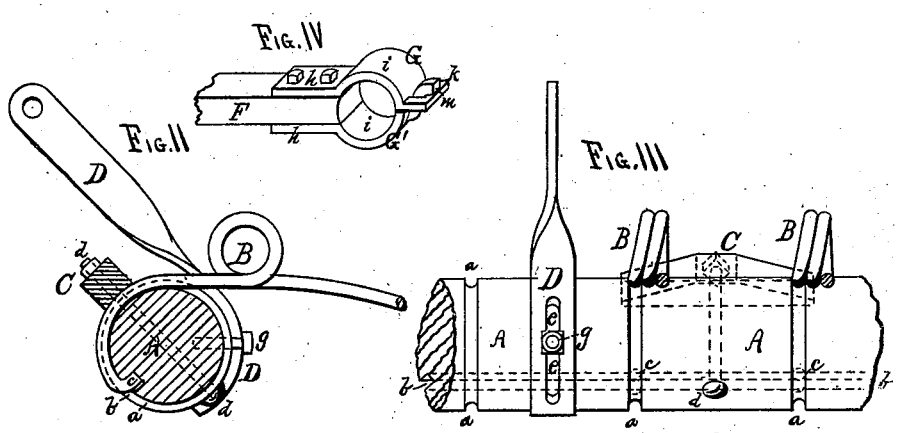

UNITED STATES PATENT OFFICE.

ORLO M. LARAWAY AND GEORGE S. KING, OF MINNEAPOLIS, MINNESOTA.

IMPROVEMENT IN HORSE HAY-RAKES.

Specification forming part of Letters Patent No. 207,811, dated September 10, 1878; application filed December 6, 1877.

*To all whom it may concern:*

Be it known that we, ORLO MELVIN LARAWAY and GEORGE SAMUEL KING, both of Minneapolis, in the county of Hennepin and State of Minnesota, have invented certain new and useful Improvements in Horse Hay-Rakes, which improvements are fully set forth in the following specification and accompanying drawings, in which—

Figure I is a plan view of a portion of a rake, showing our improvements applied thereto; Figs. II and III, detail views, enlarged, showing the tooth-fastening and dumping-lever; Fig. IV, a perspective view of the thill-clamp, detached.

This invention relates to horse hay-rakes; and consists in the method of forming and securing the teeth to the rake-head, as hereinafter described.

The invention further consists in the manner of securing the thills to the axle, as hereinafter set forth.

A is the rake-head, (which is also the axle,) made in a circular form, and provided with semicircular grooves $a$, in which the teeth B rest. $b$ is a slot or groove cut longitudinally the whole length of the axle, and in which the bent ends $c$ of the teeth sit. C C are blocks or clamps, secured to the axle by bolts $d$, and made to embrace and hold the teeth in place in the grooves $a$, so that they cannot oscillate, while the longitudinal slot $b$ prevents their being pulled out or pressed back. By this arrangement the axle and rake-head are formed in one piece, thus doing away with the cumbersome and expensive slotted board used on the ordinary rake to dump the load.

The fastening for the teeth is a very simple, cheap, and convenient device—one readily applied by any person, and not liable to become disarranged.

By forming the grooves $a$ entirely around the axle and the groove $b$ the entire length of it, they may be made by machinery, thus reducing the expense.

Another advantage derived from the grooves $a$ is, that in event of the groove $b$ tearing out by any extra strain upon the teeth, or of the axle being sprung or bent out of shape, it may be turned partially around, a new groove, $b$, cut, and the axle made as good as new; but the principal advantage derived from the use of the circular grooves is, that over one-fourth, or, if necessary, fully one-half, of the circumference of the axle may be utilized to support the teeth, thus gaining a very long bearing-surface, and rendering the tooth extremely rigid and firm, as by its semicircular bend it cannot be oscillated in the slightest degree while held in the grooves. Thus very light blocks C may be used, as the pressure required to hold the teeth is very slight, and the tooth cannot be broken by reaction, as it has the smooth round surface of the axle to recoil upon.

F F' are the thills, (but one being shown,) and secured to the axle by two metal clamps, (see Figs. I and IV,) which are formed with flat portions $h$ to fit the ends of the thills, and semicircular portions $i$ to fit the axle. The upper section, G, has a slot through its outer end, $k$, through which a spur, $m$, on the lower section, G', passes, thus locking them together. This forms a very simple and easily-adjusted clamp.

$n$ $n'$ are pins set in the axle, upon either side of the clamps G G', to prevent any side movement. By this means we avoid cutting the axle, and thus retain its full strength.

We are acquainted with the patent of C. Edgar, September 24, 1874, No. 155,505, who shows the teeth with their ends bent down into the wooden head, and held there by a block extending over two teeth, and with semicircular grooves in the blocks; but we do not claim, broadly, the blocks for holding the teeth in place.

Having thus described our invention, what we claim as new, and desire to secure by Letters Patent, is—

1. The axle A, having the circular grooves $a$ $a$ and longitudinal slot $b$, in combination with the rake-teeth B, provided with the bent ends $c$, adapted to fit into the slot $b$, and clamps C C, to hold the teeth in the grooves $a$ $a$, arranged and operating in the manner and for the purpose substantially as hereinbefore set forth.

2. The combination, with the circular axle A, provided with the pins $n$ $n'$, of the clamp G G', locked together by the slot and spur $m$, and secured to the thills F, substantially as hereinbefore set forth.

In testimony whereof we have hereunto set our hands in the presence of two subscribing witnesses.

ORLO MELVIN LARAWAY.
GEORGE SAMUEL KING.

Witnesses:
C. N. WOODWARD,
ISAAC HILL.